United States Patent [19]

Gerber

[11] Patent Number: 4,846,524

[45] Date of Patent: Jul. 11, 1989

[54] FRAME FOR FOLD DOWN TOP FOR VEHICLES

[75] Inventor: Curtis E. Gerber, Tampa, Fla.

[73] Assignee: Tampa G. Manufacturing Company, Tampa, Fla.

[21] Appl. No.: 934,430

[22] Filed: Nov. 24, 1986

[51] Int. Cl.⁴ ............................................. B60J 7/12
[52] U.S. Cl. .................................. 296/116; 296/107; 296/124; 135/88
[58] Field of Search ............... 296/107, 116, 124, 102, 296/105; 135/111, 88, DIG. 2; 114/361

[56] References Cited

U.S. PATENT DOCUMENTS

| | | | |
|---|---|---|---|
| 223,687 | 1/1880 | Whitehead | 135/DIG. 2 X |
| 363,147 | 5/1887 | Lawrence | 296/116 |
| 518,746 | 4/1894 | Sommerfruechte | 296/116 |
| 798,311 | 8/1905 | Wiet | 296/124 |
| 1,175,515 | 3/1916 | Freeman | 296/116 |
| 1,869,423 | 8/1932 | Heuer | 296/107 |
| 2,811,725 | 11/1957 | Cence | 135/88 X |
| 3,073,326 | 1/1963 | Lefebvre et al. | 135/88 |
| 3,773,379 | 11/1973 | Loiseau | 296/107 |
| 4,037,614 | 7/1977 | Hines et al. | 296/102 X |

OTHER PUBLICATIONS

Auto Boat Tops..., Chas. P. McClellan, Fall River, Mass., date unknown, pp. 4 and 6.

Primary Examiner—Dennis H. Pedder
Attorney, Agent, or Firm—Dominik, Stein, Saccocio, Reese, Colitz & Van Der Wall

[57] ABSTRACT

A frame system for a fold down top for vehicles includes first and third generally rectangular-shaped perimeter frame members and a second U-shaped frame member. In the frame system's open position, the first frame member is pivotedly connectable along its transverse lower end portion to the vehicle about a first axis in a generally upright position. The second frame member, parallel to the first frame member, is also pivotedly connected along its transverse midportion about a second axis which is rearwardly positioned from the first axis. The third frame member is horizontally positioned having its forwardly end portion forwardly disposed over the front portion of the passenger compartment of the vehicle. The third frame member is pivotedly connected along its rearwardly end portion to the second frame member about a third axis and also pivotedly connected to the first frame member and about fourth axis. Flexible non-elastic members, connected between the first, second and third frame members, in conjunction with a telescoping lockable strut member pivotedly connected between the first and third axes, serve to maintain the frame system in a stable position when open.

10 Claims, 2 Drawing Sheets

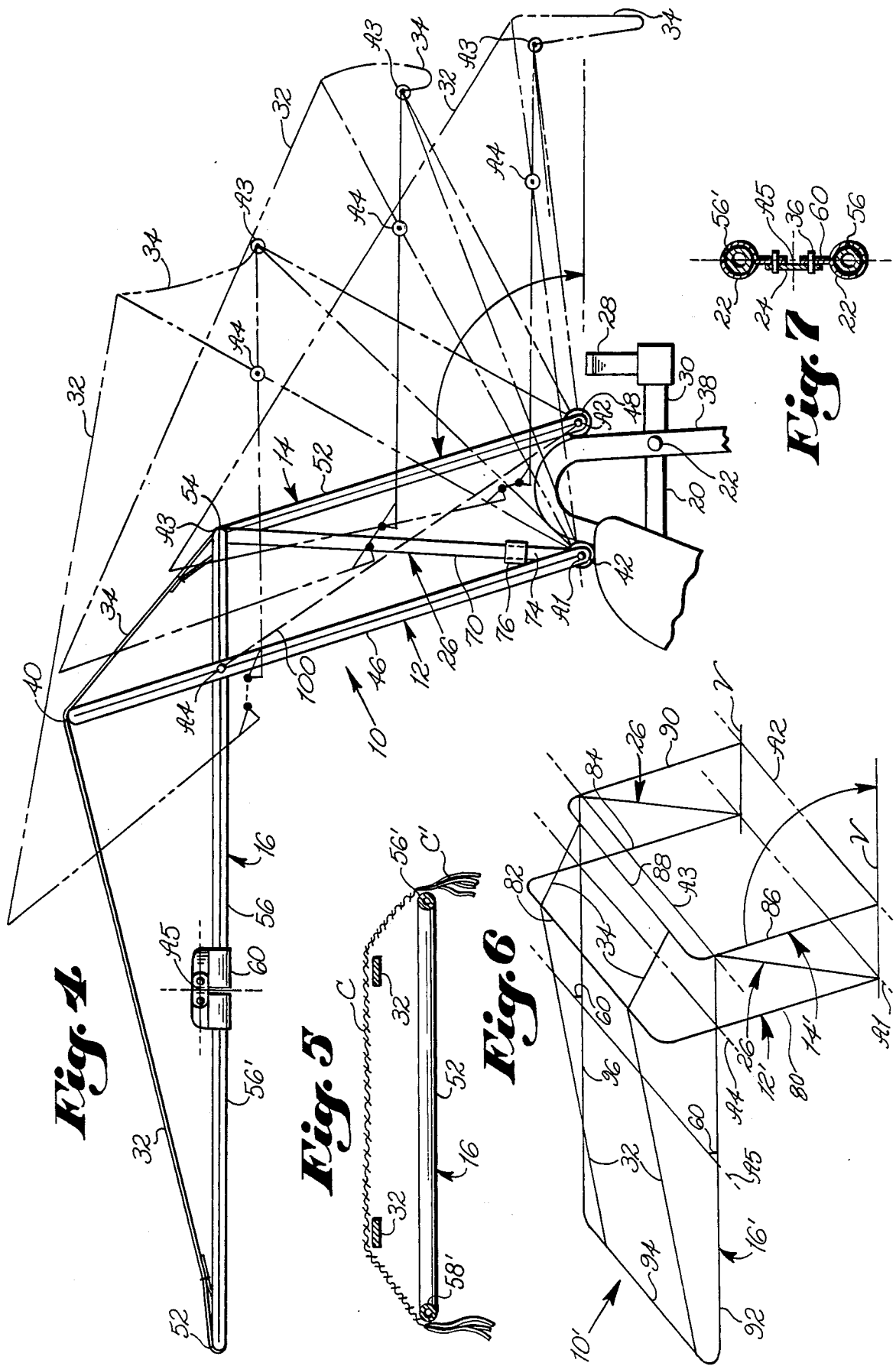

FRAME FOR FOLD DOWN TOP FOR VEHICLES

BACKGROUND OF THE INVENTION

1. Field of the Invention

This invention generally relates to removable tops for motor vehicles and, more particularly, to a foldable frame system atop golf carts and the like.

2. Description of the Background Art

Prior art discloses a number of structures for convertible or removable tops for various forms of vehicles. Two such references are directed to devices for unusual vehicles. U.S. Pat. No. 4,440,436 to Giddens discloses a convertible top for motorcycles and snow mobiles which include a plurality of pivotedly connected bow-shaped members of conventional arrangement which are foldable into a novel U-shaped container positioned behind the user's seat. Disclosed in an early U.S. Pat. No. 663,279 to Jones is a seat cover for vehicles such a mowers, tractors, reapers and other agricultural machines, the seat cover supported at the upper end of a generally upright frame member attached at its lower end behind the user's seat. The seat cover includes a plurality of bows which are pivotedly connected to a main bow in an arrangement generally radially disposed from the main bow. However, by a uniquely disposed knuckle link arrangement, the two outer auxiliary bows are locked in an open position for use, and foldable into a closed stored position when not in use.

Two prior art disclosures adapted for boats are also known to applicant. In U.S. Pat. No. 3,823,431 to Miller, a convertible top is disclosed having conventional dual inverted U-support structures which fold uniquely into a stored position at the rear of the vessel in a fashion concealing the top beneath other vessel structure. The invention disclosed in U.S. Pat. No. 4,091,484 to Means, also directed to a collapsible boat canopy, also includes conventional inverted U-shaped bow support means which are pivotedly connected within side channels and which is concealable at the rear of the boat in unique fashion when not in use.

The collapsible shelter device disclosed in U.S. Pat. No. 3,018,783 to Tyson is directed to an attachment for land vehicles such as automobiles which provides a removable laterally disposed awning type structure including framework which is releasably connectable to the roof of the automobile.

The only invention of which applicant is aware directed specifically to top means for covering the passengers within golf carts or the like is disclosed inn U.S. Pat. No. 4,098,536 to Mills which teaches a structured flexible covering adapted to completely enclose the rider's compartment of such vehicles, including transparent windshield panels, disposable over a conventional rigid roof and framework attached to the golf cart.

The present invention is designed to provide an easily foldable frame system for fold down or convertible tops for vehicles such as golf carts which includes a unique parallelogram structure with inherent locking features and structure which does not inhibit the egress or ingress of users of golf carts or the like. The frame structure is simple and efficient to manufacture, while providing a complete overhead covering for the occupants of golf carts which has substantial inherent stability against the elements and also sufficient strength and stability to resist hand grasping during ingress and egress by users. The invention is fully collapsible into a compact arrangement horizontally disposed behind the passenger seating compartment of the golf cart when not in use. The positioning and locking arrangement of this invention is preestablished so that unfolding and erecting the framework is simple and convenient for the user without the need for adjustments or individual tensioning of any of the elements each time the frame is raised.

SUMMARY OF THE INVENTION

This invention is directed to a frame system for a fold down top for vehicles having an open in-use position and a folded position for storage. One embodiment of the frame system includes first and third generally rectangular-shaped perimeter frame members each having opposing transverse portions and opposing longitudinal side portions extending therebetween. Also included is a second U-shaped frame member having a midportion and opposing side portions extending therefrom. In the frame system's open position, the first frame member is pivotedly connectable along its lower ends to the vehicle about a first axis in a somewhat upright position. The second frame member, generally parallel to the first frame member, is also pivotedly connected along its midportion to support structure attached to the vehicle about a second axis which is rearwardly positioned from the first axes. The third frame member is generally horizontally positioned having its forwardly end portion disposed over the front portion of the passenger compartment of the vehicle. The third frame member is pivotedly connected along its rearwardly end portion to the second frame member about a third axis and also pivotedly connected to the first frame member about a fourth axis. The first frame member is taller than the second frame member such that flexible non-elastic members connected between the first, second and third frame members, in conjunction with a telescoping lockable strut member pivotedly connected between the first and third axes, serve to maintain the frame system in a stable position when open. In all embodiments, when viewed from the side, the first, second, third and fourth axes form a parallelogram with the third and fourth axes positioned above the second and first axes respectively. By this configuration, the frame system is easily foldable from and to a collapsed horizontal position rearwardly disposed on the vehicle.

It is therefore an object of this invention to provide a frame system pivotedly connectable to a vehicle which will provide a stable framework onto which a cover formed of a sheet of flexible material may be applied and connected thereto.

It is another object of this invention to provide a foldable frame system pivotally connectable to a vehicle which may be easily and conveniently foldably stored in a general horizontal position at the rear of the vehicle.

It is another object of this invention to provide a foldable frame system pivotally connectable to a vehicle which has complete stability during use.

It is another object of this invention to provide a foldable frame system pivotally connectable to a vehicle which does not inhibit ingress into and egress from the vehicle when the frame system is in its opened in-use position.

In accordance with these and other objects which will become apparent hereinafter, the instant invention will now be described with reference to the accompanying drawings in which:

BRIEF DESCRIPTION OF THE DRAWINGS

FIG. 4 is a side elevation view of the invention in its open configuration and showing schematically the folding of the invention in increments;

FIG. 5 is a section view in the direction of arrows 5—5 in FIG. 1;

FIG. 6 is a schematic perspective view of another embodiment of the invention in its open configuration; and FIG. 7 is a section view in the direction of arrows 7—7 in FIG. 3.

DETAILED DESCRIPTION OF THE PREFERRED EMBODIMENT

Figure 1:
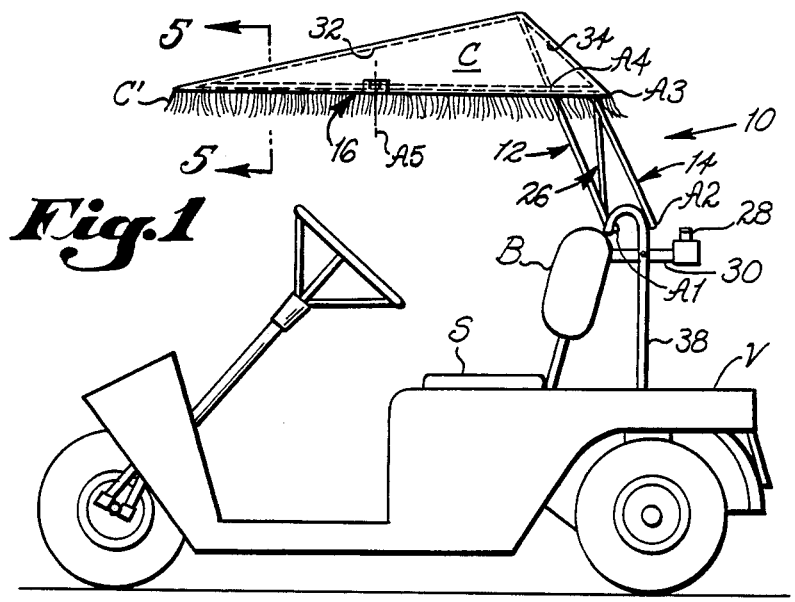
FIG. 1 is a side elevation view of the invention in its open position including a shaped cover in place thereover connected to a golf cart.

Referring now to the drawings, and particularly to FIGS. 1, 2, 3, and 4, the invention is shown generally at numeral 10 and includes first, second, and third frame members 12, 14 and 16 respectively. Flexible cover C, having fringe margin C', which may also be a flexible hem or decoration, is applied over the frame system 10 as shown to provide sun and rain protection for the occupants of the vehicle V while seated atop seat S.

The first frame member 12 has a generally rectangular perimeter shape having upper and lower transverse portions 40 and 42 respectively and side portions 44 and 46. First frame member 12 is pivotely connected by brackets 41 along axis A1 to the vehicle V along the upper margin of the seat back B to seat support 38 as shown.

The second frame member 14 has a generally inverted U-shape frame and includes midportion 48 and side portions 50 and 51. This second frame member 14 is pivotedly connected to the rear of seat supports 38 along its midportion 48 about axis A2 by brackets 64.

The third frame member 16 has a generally rectangular perimeter shape horizontally disposed and having forwardly and rearwardly disposed transverse end portions 52 and 54 respectively and opposing longitudinal side portions 56 and 58. The rearwardly disposed end portion 54 is coaxially pivotedly connected by brackets 68 with the ends of the second frame member 14 along axis A3. The side portions 56 and 58 are pivotedly connected by pins 18 to the side portions 44 and 46 of the first frame member 12 along axis A4.

Figure 2:
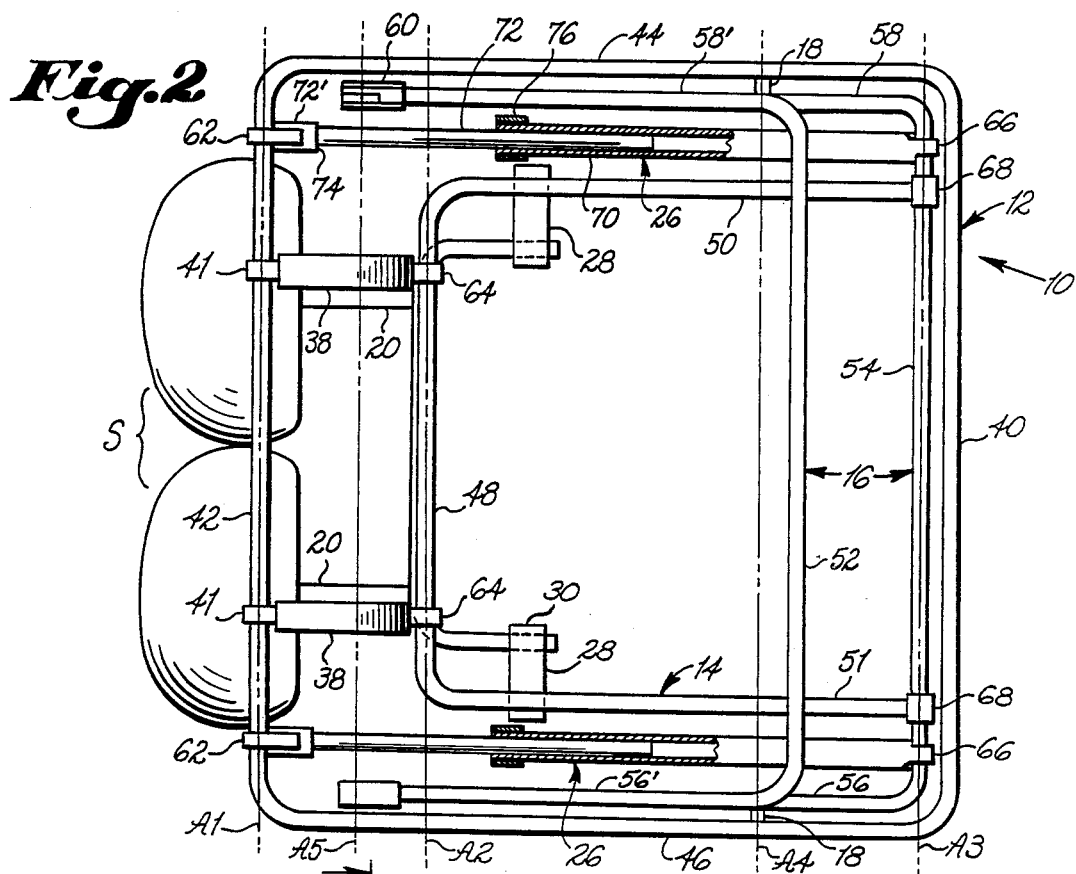
FIG. 2 is a partially broken top plan view of the invention in its folded position and in relation to the seating of the golf cart.

Diagonally disposed and pivotedly connected between axis A1 and A3 by brackets 62 and 66 are a pair of strut members 26. As best seen in FIG. 2, these strut members 26 include mating telescoping rigid tubular portions 70 and mating inner shaft portions 72. This arrangement facilitates a slidingly variable length strut structure which also includes end stop 74 and locking collar 76. As best seen in FIGS. 2 and 4, the end stop 74 is adapted to mate against the end of locking collar 76 and tubular portion 70 when the frame system 10 is in its open position to serve as a positive stop to prevent further pivotal opening movement of the frame system 10. Locking collar 76 is adapted to threadably engage over tapered mating threads on the end of tubular portion 70 to lockingly clamp the end of tubular portion 70 against the outer surface of inner shaft 72 to securely lock the overall length of struts 26 at a predetermined length. In the open position, this predetermined length is wherein the locking collar 76 is against stop 74 as previously described.

Horizontally disposed third frame member 16 includes an offset hinge arrangement of collars 60 which pivotedly segments the side portions thereof about axis A5 such that the forwardly end portion 52 and side segments 56' and 58' may be pivoted about imaginary axis A5 in relation to the rearwardly disposed end portion 54 and side segments 56 and 58. As best seen in FIGS. 4 and 7, the arrangement of collar 60 pairs, which are connected over side segments 56, 56', 58 and 58', are pivotedly connected about pivot pins 36 in an arrangement which places these pivot pins 36 offset from the longitudinal axis of side segments 56/56' and 58/58' respectively. Link 24 is also attached by pivot pins 36 to bridge the two adjacent collars 60 of the pair. By this arrangement, then, the forwardly portion of third frame member 16 may be pivoted about imaginary axis A5 on pivot pins 36 upwardly from a position wherein side segments 56/56' and 58/58' are coaxial. Note that mating collars 60 also serve as stop means to limit the opening movement of third frame member 16 to a horizontal plane. It is also noted that other embodiments may suffice such as, for example, an offset hinge having a single pivot aligned with imaginary axis A5, without departing from the spirit and scope of the invention.

Referring now to FIGS. 4, the closing and opening geometry of the frame system 10 is depicted in increments from the fully open position shown in solid line to the closed position wherein the frame system 10 is horizontally disposed rearwardly from the seat back B. Axes A1, A2, A3 and A4 form the corners of a parallelogram with axes A3 and A4 upwardly and forwardly disposed from axes A2 and A1 respectively as shown. Flexible, generally non-elastic members 32 and 34 are included in the invention 10, with flexible members 32 being connected at their ends between the forwardly end portion 52 of third frame member 16 and the upwardly end portion 40 of the first frame member 12. Flexible members 34 are connected between the upwardly end portion of first frame member 12 and the rearwardly end portion 54 of third frame member 16 as shown. With struts 26 in their fully closed and locked position as previously described, the frame system 10, as shown in solid lines in FIG. 4, is fully stabilized by flexible member 32 and 34 in conjunction with strut 26 such that the frame system 10 is resistant to both wind and rain, as well as user's hand grasping during ingress into and egress from the vehicle V.

Figure 3:
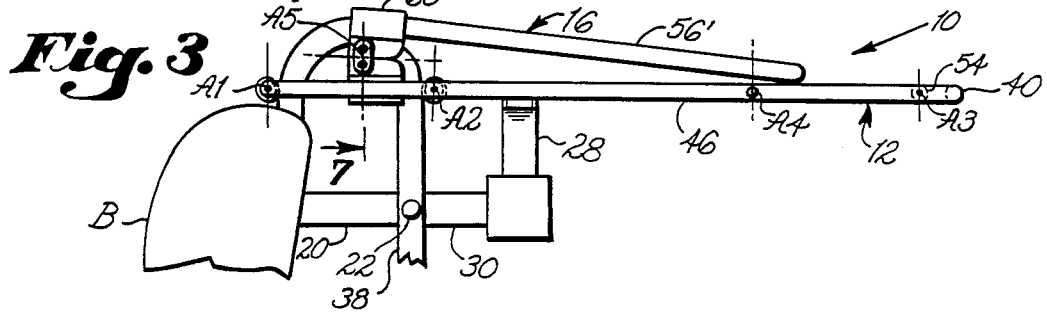
FIG. 3 is a part (left) side elevation view of the invention in FIG. 2.

Still referring to FIG. 4, when locking collar 74 (or other mechanism such as a detent button) is released, first and second frame members 12 and 14 may be pivoted rearwardly about axes A1 and A2 by the user. As these first and second frame members 12 and 14 are thusly pivoted rearwardly, flexible members 32, applying tension to the forwardly end portion 52 of third frame member 16 begin to pivot the forwardly portion of the third frame member 16 upwardly about axis A5 as shown. Note that, as the rearwardly pivoting of first and second frame members 12 and 14 progresses, strut 26 is substantially telescopically elongated, thus depicting its locking effectiveness. Flexible members 34 become inactive and droop as shown; however, flexible members 32 continue to pivot the forwardly portion of third frame member 16 about imaginary axis A5 upwardly and rearwardly as shown. When first and second frame members 12 and 14 are nearly horizontal, the third frame member 16 may be folded back on itself and the entire frame system 10 may be fully closed in the rearwardly horizontally disposed position as best seen in FIGS. 2 and 3.

Connected to the seat back support structure 38 is brace 30 having a generally C-shaped configuration. Connected to the ends of brace 30 are L-shaped supports 28 having generally horizontally disposed upper portions as shown. These support brackets 28 are rigidly disposed to support the second frame member 14 and, thereby, the entire frame system 10 in its horizontal rearwardly disposed closed position when not in use. This stored position is best seen in FIGS. 2 and 3 wherein axes A3 and A4 are generally rearwardly disposed from axes A1 and A2 as shown.

Referring now to FIG. 5, the flexible formed cover C is shown supportively disposed over tensioned flexible members 32 and the side portions 56/56' and 58/58'. The cover C may be fixed atop the frame system by fastening either to the flexible members 32 or portions of the first and third frame members 12 and 16.

Referring now to FIG. 6, another embodiment of the invention is shown generally at 10' in schematic form. This embodiment 10' generally provides the same overall structure and pivotal axes as previously described. However, the structure is effected somewhat differently with the elimination of at least two of the transverse end portions of previously referenced first and third frame members 12 and 14 along axes A1 and A2. These eliminated end portions are substituted by already available portions of the vehicle V and modified pivotal connections disposed as herebelow described.

This embodiment 10' includes generally inverted U-shaped first frame member 12', generally inverted U-shaped second frame member 14' and horizontally disposed U-shaped frame member 16'. These frame members 12', 14' and 16' are pivotedly connected along axes A1, A2, A3 and A4 as previously described wherein these axes form a parallelogram, again as previously described. Telescoping struts 26 are pivotedly connected between axes A1 and A3 as in the previous embodiment. This embodiment also includes the self-stopping pivotal connections 60 along axis A5 as was earlier described. First frame member 12' includes transversely disposed midportion 82 and side portions 80 and 84. The second U-shaped frame member 14' includes transversely disposed midportion 94 and horizontally disposed side portions 92 and 96. The first frame member 12' is pivotedly connected at its ends along axis A1, while second frame member 14' is pivotedly connected at its ends along axis A3 and, additionally is pivotedly connected along axis A4 along its side portions 92 and 96 to the side portions 80 and 84 respectively of first frame member 12'.

In all embodiments, the first frame member extends upwardly above both the rearwardly disposed end portion 54 of third frame member 16 and the transverse midportion 88 of second frame member 14'. This arrangement provides the geometry necessary to enable the flexible members 32 and 34, in conjunction with lockable struts 26, to stabilize the frame system in its open position.

Referring lastly to FIG. 4, in lieu of the telescoping locking strut 26, a flexible non-elastic member 100 may be included connected between axes A2 and A4. Because, during the opening of the frame member from the folded position to the in use position, axes A2 and A4 move apart from one another, the length of flexible member 100 being preset, limits the counterclockwise rotation of first and third frame members 12 and 14 to establish the open in use orientation of the frame system 10. Flexible members 32 and 34 then function as previously described to effect the additional frame system 10 stabilization in the open position in conjunction with flexible member 100.

While the instant invention is shown and described herein in what is conceived to be the most practical and preferred embodiment, it is recognized that departures may be made therefrom within the scope of this invention, which is therefore not to be limited to the details disclosed herein, but is to be accorded the full scope of the claims so as to embrace any and all equivalent apparatus and articles.

What is claimed is:

1. A frame system for a fold down top for vehicle comprising:

a first generally rectangular-shaped perimeter frame member having opposing transverse end portions and opposing downwardly disposed side portions pivotedly connectable along one said end portion to a vehicle about a first axis disposed in fixed relation to the vehicle.

a second generally inverted U-shaped frame member having a transverse midportion and opposing upwardly disposed side portions pivotedly connectable along said midportion to the vehicle about a second axis disposed in fixed relation to both said first axis and the vehicle rearwardly of said first axis;

a third generally rectangular-shaped frame member adapted to be generally horizontally disposed above the vehicle when erected and having opposing transverse end portions and opposing longitudinal side portions pivotedly connected to ends of said side portions of said second frame member along one of said third member end portions about a third axis;

said third frame member side portions also pivotedly connected to said first frame member side portions about a fourth axis;

said first frame member side portions and an upper one of said first frame member end portions extending above said third frame member;

an elongated rigid telescoping strut member lockable at a particular overall length and pivotedly connected at its ends between said first and third axes;

said third frame member side portions each pivotedly segmented about a fifth axis positioned between said fourth axis and a forwardmost of said third frame member end portions such that said third frame member is foldable onto itself about said fifth axis; and said first, second, third and fourth axes forming corners of a parallelogram.

2. A frame system as set forth in claim 1, further comprising support means disposed rearwardly of said first and second axes and adapted to be connected to the vehicle for supporting said frame assembly in a folded and stored generally horizontal configuration.

3. A frame system as set forth in claim 1, wherein in an unfolded up position said third and fourth axes are forwardly and upwardly disposed of said second and first axes, respectively.

4. A frame system as set forth in claim 1, further comprising stop means in conjunction with said pivotal connections about said fifth axis for limiting said third frame member segmented side portions from pivotedly opening about said fifth axis beyond a straight orientation.

5. A frame system as set forth in claim 2, further comprising strut stop means for limiting the shortest length to which said strut member will telescope, said shortest length sized to be coincident with the distance between said first and third axes when said frame assembly is in its open position.

6. A frame system for a fold down top for vehicles comprising:
- a first U-shaped frame member having a transverse midportion and opposing downwardly disposed side portions pivotedly connectable at each end to a vehicle about a first axis disposed in fixed relation to the vehicle; and
- a second generally U-shaped frame member having a transverse midportion and opposing downwardly disposed side portions pivotedly connectable at each end to the vehicle about a second axis disposed in fixed relation to both said first axis and the vehicle rearwardly of said first axis;
- a third generally U-shaped frame member adapted to be generally disposed above the vehicle when erected and having a transverse midportion and opposing rearwardly disposed side portions pivotedly connected at each end to said second frame member about a third axis;
- said third frame member side portions also pivotedly connected to said first frame member side portions about a fourth axis;
- said first frame member mid- and side portions extending above said second frame member mid- and side portions;
- an elongated rigid telescoping strut member lockable at a particular overall length and pivotedly connected at its ends between said first and third axes;
- said third frame member side portions each pivotedly segmented about a fifth axis positioned between said fourth axis and a forwardmost of said third frame member portions such that said third frame member is foldable onto itself about said fifth axis; and
- said first, second, third and fourth axes forming corners of a parallelogram.

7. A frame system as set forth in claim 6, further comprising support means disposed rearwardly of said first and second axes and adapted to be connected to the vehicle for support said frame assembly in a folded and stored generally horizontal configuration.

8. A frame system as set forth in claim 6, in an unfolded up position said third and fourth axes are forwardly and upwardly disposed of said second and first axes, respectively.

9. A frame system as set forth in claim 6, further stop means in conjunction with said pivotal connections about said fifth axis for limiting said third frame member segmented side portions from pivotedly opening about said fifth axis beyond a straight orientation.

10. A frame system as set forth in claim 7, further comprising strut stop means for limiting the shortest length to which said strut member will telescope, said shortest length sized to be coincident with the distance between said first and third axes when said frame assembly is in its open position.

* * * * *